United States Patent
Anderson et al.

(10) Patent No.: US 10,196,051 B2
(45) Date of Patent: Feb. 5, 2019

(54) BRAKE CONTROL UNIT

(71) Applicant: Robert Bosch GmbH, Stuttgart (DE)

(72) Inventors: Chris Anderson, Paris (FR); Christian Schalkwijk, Yzeure (FR); Raynald Sprocq, Esbly (FR); Bastien Cagnac, Cramoisy (FR)

(73) Assignee: Robert Bosch GmbH, Stuttgart (DE)

( * ) Notice: Subject to any disclaimer, the term of this patent is extended or adjusted under 35 U.S.C. 154(b) by 304 days.

(21) Appl. No.: 14/906,135

(22) PCT Filed: Jul. 9, 2014

(86) PCT No.: PCT/EP2014/064681
§ 371 (c)(1),
(2) Date: Jan. 19, 2016

(87) PCT Pub. No.: WO2015/007584
PCT Pub. Date: Jan. 22, 2015

(65) Prior Publication Data
US 2016/0159330 A1 Jun. 9, 2016

(30) Foreign Application Priority Data
Jul. 19, 2013 (FR) ...................... 13 57114

(51) Int. Cl.
*B60T 11/18* (2006.01)
*B60T 11/20* (2006.01)
(Continued)

(52) U.S. Cl.
CPC .............. *B60T 11/20* (2013.01); *B60T 7/042* (2013.01); *B60T 11/18* (2013.01); *B60T 11/224* (2013.01); *B60T 11/236* (2013.01)

(58) Field of Classification Search
CPC ...... B60T 11/236; B60T 11/224; B60T 11/18; B60T 7/042
(Continued)

(56) References Cited

U.S. PATENT DOCUMENTS 4,655,512 A * 4/1987 Leiber ................... B60T 8/341
188/DIG. 1
5,246,281 A 9/1993 Leppek
(Continued)

FOREIGN PATENT DOCUMENTS

DE 10 2012 018 134 A1 3/2013
GB 2 155 571 A 9/1985
(Continued)

OTHER PUBLICATIONS

International Search Report and Written Opinion corresponding to PCT Application No. PCT/EP2014/064681, dated Sep. 10, 2014 (German and English language document) (10 pages).

*Primary Examiner* — Michael Leslie
*Assistant Examiner* — Dustin T Nguyen
(74) *Attorney, Agent, or Firm* — Maginot, Moore & Beck LLP

(57) ABSTRACT

A brake control unit includes a primary piston and a secondary piston that respectively define a primary chamber and a secondary chamber. The primary piston carries an intermediate piston that slides in the secondary piston. A primary insulating seal is disposed between the pistons such that the primary insulating section of the primary insulating seal only depends on the equivalent section connecting the force applied at the inlet and the secondary pressure. The ratio of the hydraulic sections is configured to be modified without having to intervene on the primary and secondary (Continued)

pressure seals for the main piston and the secondary seal by way of modifying the section of the plunger piston and that of the seal thereof.

15 Claims, 6 Drawing Sheets

(51) Int. Cl.
  *B60T 7/04* (2006.01)
  *B60T 11/224* (2006.01)
  *B60T 11/236* (2006.01)
(58) Field of Classification Search
  USPC .......................................................... 60/562
  See application file for complete search history.

(56) References Cited

U.S. PATENT DOCUMENTS

| 6,012,288 | A | * | 1/2000 | Gualdoni | ................ | B60T 11/16 |
| | | | | | | 29/888.06 |
| 2001/0032464 | A1 | * | 10/2001 | Inoue | ...................... | B60T 11/20 |
| | | | | | | 60/562 |
| 2011/0285197 | A1 | * | 11/2011 | Ganzel | ................... | B60T 7/042 |
| | | | | | | 303/2 |

FOREIGN PATENT DOCUMENTS

| GB | 2 169 676 A | 7/1986 |
| WO | 97/32765 A1 | 9/1997 |

* cited by examiner

BRAKE CONTROL UNIT

This application is a 35 U.S.C. § 371 National Stage Application of PCT/EP2014/064681, filed on Jul. 9, 2014, which claims the benefit of priority to Serial No. FR 1 357 114, filed on Jul. 19, 2013 in France, the disclosures of which are incorporated herein by reference in their entirety.

BACKGROUND

The present disclosure has as its object a brake control unit including a primary piston defining a primary chamber connected to a primary circuit and a secondary piston defining a secondary chamber connected to a secondary circuit, the control unit receiving the braking demand signal supplied via the push-rod actuated by the driver, said demand signal being detected by the displacement sensor for the movement of the push-rod in order to control the primary piston, which itself pushes against the secondary piston, thereby generating a pressure inside the primary chamber which then exerts a hydraulic thrust on the rear cross section of the secondary piston.

Generally, the disclosure has as its object a brake control unit which corresponds substantially to a tandem master cylinder and is intended, for example, for hybrid vehicles. The primary chamber is connected to the hydraulic circuit for the brakes of the rear axle, which is not a driving axle. The secondary chamber is connected in a decoupled manner to the braking circuit of the front axle. The front axle is a driving axle. It is equipped with electric motors ensuring regenerative braking (dynamic braking) in combination with mechanical braking via brakes that are controlled by a braking circuit. However, the braking circuit for the front axle is not connected directly to the secondary pressure chamber which acts indirectly. Braking of the front axle is assured, initially, principally by the dynamic braking, the electric motors functioning as a generator and from a certain speed down to zero speed, the mechanical braking being combined with the dynamic braking before replacing it completely when the speed falls below 10 km/h, for example, and continuing down to 0 km/h.

It should be noted that the pressure generated inside the secondary chamber of a tandem master cylinder results from the thrust generated by the primary pressure acting on the hydraulic cross section of the rear part of the secondary piston, said thrust going on to generate a pressure inside the secondary chamber according to the hydraulic cross section of the front part of the secondary piston. The hydraulic cross sections of the front and rear parts of the secondary piston usually being of the same value, the primary and secondary pressures of a traditional master cylinder are substantially the same.

Generally, certain recent braking systems require a master cylinder having a bore of small dimensions for multiple reasons, such as the characteristics in degraded mode or the feel through the pedal. However, producing bores of reduced cross sections in master cylinders and grooves for cups of small dimensions is a difficult and costly machining operation. Furthermore, cups (or lip seals) of small dimensions of the kind that would be necessary do not exist in the standard manufacturing ranges. These special seals would be difficult to develop, to manufacture and to install in the throat surrounding the bore, by comparison with the installation of lip seals with a large diameter.

In addition, machining throats in bores with a small diameter is a difficult and costly operation.

FIG. 1 is a simplified diagram of a tandem master cylinder, of a known kind, for the purpose of describing the definition of the characterizing feature connecting the inlet force $F_{IN}$, applied by the push-rod to the primary piston P1 and the pressure Ps inside the secondary chamber CH2.

The tandem master cylinder has a primary piston P1, of which the front cross section S1 defines the primary chamber CH1 which is further defined by the rear cross section S2 of the secondary piston P2.

The front cross section S2$b$ of the secondary piston P2 defines the secondary chamber CH2.

Under the effect of the force FIN, a primary pressure Pp is present inside the primary chamber CH1, which pressure Pp, when applied to the secondary rear cross section S2 of the secondary piston P2, generates a force Fs displacing the secondary piston, of which the front cross section S2$b$ generates the secondary pressure Ps inside the secondary chamber CH2.

By definition, the relationship between the inlet force $F_{IN}$ and the secondary pressure $P_S$ is as follows:

$$Ps = \frac{F_{IN}}{k}$$

being an equation in which the coefficient k has the dimension of a surface; this coefficient is referred to by convention as the "equivalent cross section Se", such that:

$$Ps = \frac{F_{IN}}{Se} \quad (1)$$

However, in the master cylinder defined above, the primary pressure $P_p$ inside the primary chamber CH1 is given by the following equation:

$$P_p = \frac{F_{IN}}{S1} \quad (2)$$

This primary pressure gives rise to the force Fs exerted on the secondary piston P2 according to the equation:

$$Fs = P_p \cdot S_2 = \frac{F_{IN}}{S_1} \cdot S_2 \quad (3)$$

The force Fs generates the pressure Ps inside the secondary chamber CH2:

$$Ps = \frac{Fs}{S_{2b}} = F_{IN} \cdot \frac{S_2}{S_1 \cdot S_{2b}} \quad (4)$$

The equivalent cross section SE may accordingly be described as follows:

$$Ps = \frac{F_{IN}}{Se}(1) \rightarrow Se = \frac{F_{IN}}{Ps} = \frac{S_1 \cdot S_{2b}}{S_2}$$

The following equation is thus obtained:

$$Se = \frac{S_1}{S_2} \cdot S_{2b} \quad (5)$$

The presentation made above with the cross sections of the pistons, according to normal practice in the field of master cylinders, gives the diameter of the pistons or the seals (cups) according to the following traditional formula connecting the surface of a circular disc to its diameter D:

$$S = \pi \times \frac{D^2}{2^2} = \frac{\pi}{4} \times D^2 \quad (6)$$

or also:

$$D = 2\sqrt{\frac{S}{\pi}} \quad (6bis)$$

SUMMARY

The problem that the disclosure proposes to resolve is that of adapting the pressure inside the primary chamber and inside the secondary chamber in order to satisfy the demands of designers when developing a brake control unit or a tandem master cylinder making it possible to realize small hydraulic cross sections while utilizing traditional means and the seals in the manufacturers' standard catalogues without a requirement for special manufacture.

For this purpose, the object of the present disclosure is a brake control unit or a tandem master cylinder of the type defined above, characterized by
 a plunger piston carried by the primary piston, integral in translation with the latter and penetrating freely into the secondary piston so that the primary chamber is defined between the primary piston, the secondary piston in their bore and the plunger piston,
 the primary piston having a primary pressure seal, the secondary piston having a secondary pressure seal, and the plunger piston being equipped with a primary insulating seal for its engagement in the secondary piston, such that
  the primary piston has a front hydraulic cross section equal to the difference in its primary pressure cross section and in its primary insulating cross section, and
  the secondary piston has a rear hydraulic cross section equal to the difference between its secondary insulating cross section and its primary insulating cross section, and
  the front cross section of the secondary piston is connected to the equivalent cross section connecting the inlet force to the secondary pressure by the equation $$S1b = A\frac{Se - B}{Se - C}$$

said equation indicating the primary insulating cross section and the diameter of the primary insulating seal as a function of the equivalent cross section.

In the case of the present disclosure, the hydraulic cross section of the rear part of the secondary piston is equal to the difference in the cross section of the secondary insulating seal and that of the primary insulating seal. The hydraulic cross section of the front part of the secondary piston results from the value of the diameter of the secondary pressure seal on its front part. These two hydraulic cross sections may be of different values depending on the dimensions of the piston and the diameter of the selected seals, and the law governing the increase in pressure in the secondary chamber as a function of the input effort on the part of the driver may be determined independently from that of the primary chamber and may, furthermore, be equivalent to that generated by a piston and a seal of the traditional kind having a much smaller diameter, the realization of which would be difficult for the reasons mentioned above.

Thus, in general, since the equivalent cross section is the coefficient linking the inlet force applied to the primary piston and the pressure inside the secondary chamber, the cross section of the primary insulating seal is simply obtained according to the disclosure, that is to say the diameter of said primary insulating seal, which, for a primary pressure cross section and a secondary pressure cross section, either given or unchanged, makes it possible to define the primary insulating cross section depending on the different equivalent cross sections which are imposed on the master cylinder.

The provision of a plurality of sizes in the product range depending on the needs of a given vehicle may be facilitated as a result. For example, it may be preferable to fix the values of the primary pressure seal and of the secondary pressure seal in order to be able to utilize standard components of conventional diameter, and of which, furthermore, the size will facilitate the integration of other elements into the product that perform other functions, for example a magnet of a sufficient size to provide a position sensor function. Depending on the needs of a given vehicle, and depending on its mass and its mass distribution between the two axles, the laws governing the increase in pressure in the primary and secondary chambers as a function of the input effort on the part of the driver may be regulated independently of one another by modifying respectively the diameter of the primary insulating seal of the plunger piston as well as that of the bearing which receives it in the secondary piston, and that of the secondary insulating seal as well as the additional bearing which receives it. These transformations do not affect the other parts of the brake control unit and, in particular, the principal bores of the body, so that this embodiment offers very considerable flexibility of adaptation without the requirement for the practical modification of a manufacturing chain.

In a particularly advantageous manner, the primary pressure seal and the secondary pressure seal are cups, that is to say annular seals having a recumbent U-shaped cross section with two lips, and the primary insulating seal is a toric seal.

The primary hydraulic cross section and the secondary hydraulic cross section are thus modified simply by the cross section of the primary insulating seal that is available in continuous range of dimensions, albeit greatly reduced, and by the cross section of the secondary insulating seal in the existing range of lip cups. This permits the hydraulic cross sections to be reduced advantageously without being obliged to reduce the cross sections of the primary and secondary pressure seals, which, under these conditions, do not require any special manufacturing that is difficult to accomplish and at a cost that would be prohibitive, since these seals may be seals with the minimal dimensions available in the manufacturing ranges. It is thus possible to make use of seals, that is to say pressure cups, which are produced under good conditions of reliability and cost-effectiveness up to a diameter equal to 19 mm without being obliged to go beneath this limit, which, as already indicated, would result in considerable technical complexities, both for the production of the pressure cup and for the realization of the throat which receives it in the body of the master cylinder, thereby leading to a prohibitive cost.

The flexibility of adaptation is achieved essentially thanks to the plunger piston and to the choice of the cross section of the primary insulating seal for providing sealing between the plunger piston and the secondary piston. This seal can be selected from the almost continuous range of sizes that are available for toric seals.

This freedom is equally significant for the requirement in respect of the organization of the pressures inside the primary and secondary chamber due to the presence of the magnets for detecting the movement of the control rod and of the primary piston to which it is connected in the body of the brake control unit.

In fact, for reasons of mechanical strength, the body of the control unit must have a certain thickness, in addition to which the position detecting magnets which cooperate with a sensor must provide a sufficiently strong magnetic field. The magnets are thus required to have a large size, and their size in all cases must not be below a limit dimension. These magnets, for example of annular form, are made in certain cases from noble materials, such as rare earths. The diameter of the magnets likewise imposes a limit that is lower than the minimum diameter of the primary piston. The inventive solution makes it possible to respond to this multiplicity of difficulties associated with the adaptation of the primary hydraulic cross section and the secondary hydraulic cross section.

The positioning at rest of the resupply holes for the primary piston in relation to the primary pressure cup permits the dead travel to be increased in order to simulate the surge function.

According to another advantageous characterizing feature, the primary piston includes a skirt equipped with a body forming the partition closing the primary piston and receiving, on one side, the head of the push-rod originating from the brake pedal and carrying, on the other side, the plunger piston, the skirt being equipped with an external collar beyond the rear cross section of the primary piston intended to serve as a stop abutting against a shoulder formed by the bore guiding the primary piston and, at the front of the primary piston, the bore with a larger diameter receiving the secondary piston.

According to another advantageous characterizing feature, the front of the primary piston carries externally a magnet for detecting movement and housing internally the extremity of the plunger piston engaged on a pin projecting from the body of the primary piston. The space available at the front of the primary piston and, in particular, the reduced cross section that can be imparted to the front of the primary piston, which does not interfere either in the supply to the primary chamber or in the sealing of said chamber, makes it possible to have sufficient space available to accommodate a powerful annular magnet surrounding the primary piston.

According to another advantageous characterizing feature, the plunger piston includes an axial housing intended to accommodate a compression spring pressing against the base of the plunger piston and against the base facing towards the secondary piston.

It is thus likewise possible to have a compression spring which exerts a weak reaction opposing the initial force exerted on the pedal, and the spring coefficient may likewise be weak in order to have a weak initial force gradient.

According to another advantageous characterizing feature, the secondary piston is formed by a rear part of large diameter and by a front part of small diameter, the rear part being housed in a bore having a large diameter including the secondary insulating seal, and the front extremity of reduced diameter of the secondary piston being housed in a bore equipped with the secondary pressure seal, the internal surface of the part of large diameter of the secondary piston including a bearing equipped with the primary insulating seal by the plunger piston.

BRIEF DESCRIPTION OF THE DRAWINGS

A brake control unit according to the disclosure is represented in the accompanying drawings, in which.

DETAILED DESCRIPTION

Figure 2:
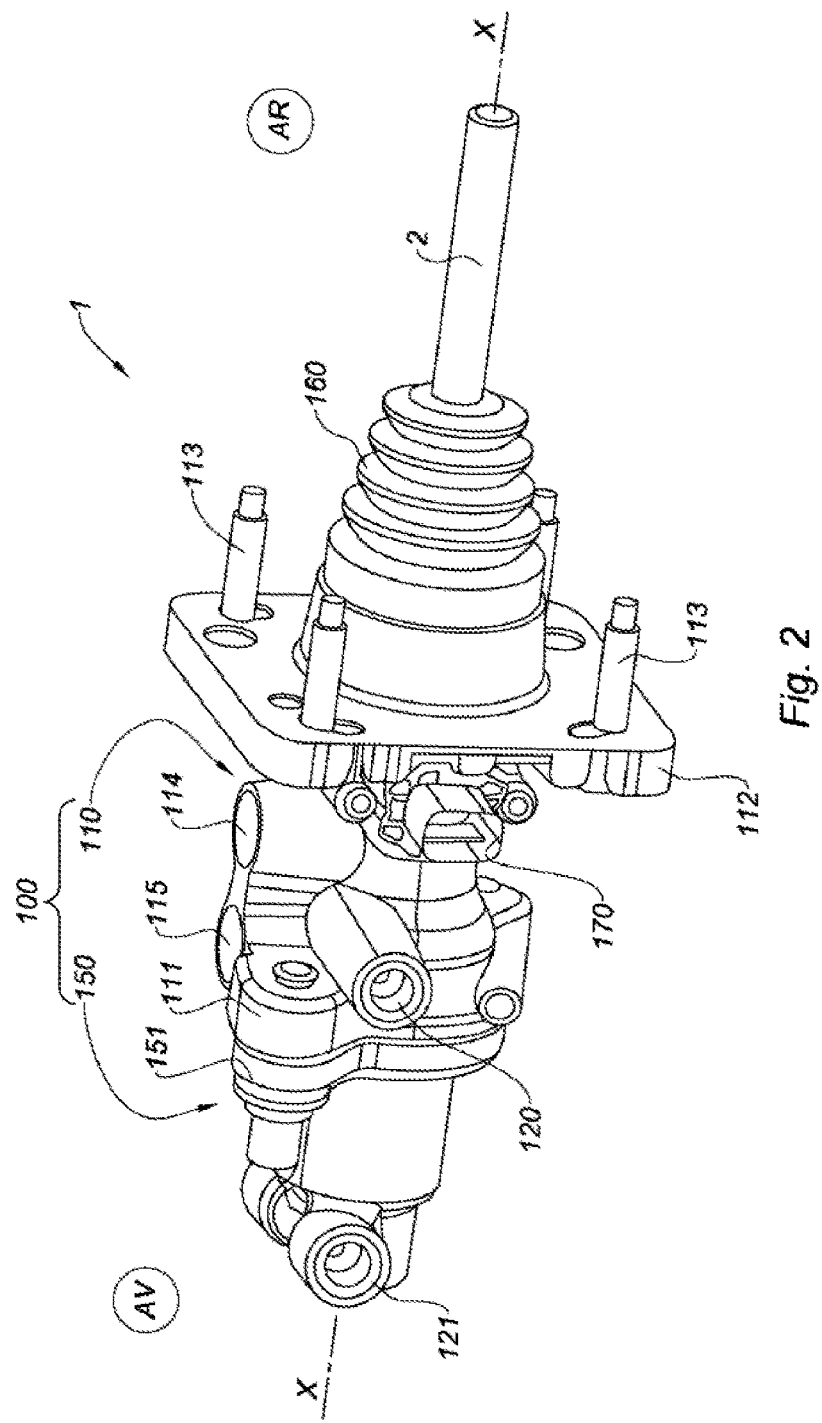
FIG. 2 is an isometric view of the brake control unit.

According to FIG. 2, the brake control unit 1 represented with its rear side (AR) to the right and its front side (AV) to the left in the usual direction of installation of a brake master cylinder in a vehicle consists of a body 100 formed by a principal part 110 at the rear and by an auxiliary part 150 at the front; these two parts are equipped with assembly lugs 111, 151 traversed by screws; two pairs of lugs in diametrically opposed positions are evident in FIG. 2. The body 100 is equipped with a flange 112 for its attachment to the front partition of the passenger compartment of the vehicle by means of screws 113. The push-rod 2 connected to the brake pedal and the gaiter 160 which protects the passage of the push-rod 2 and the inlet to the principal part 110 of the body are evident beyond the flange 112. Present in front of the flange 112 is a sensor 170 equipped with a connector used for its attachment, and which detects the demand signal from the driver in the form of the displacement of the push-rod 2.

The principal part 110 includes thereon two inlets 114, 115 for the brake fluid reservoir; the right-hand inlet 114 is connected to the primary chamber associated with the primary circuit, and the left-hand inlet 115 is connected to the secondary chamber of the secondary circuit. The primary spigot 120, to which the primary circuit of the braking system is connected, and the secondary spigot 121, to which the secondary circuit for the brake is connected, are evident on the side of the body.

The principal part 110 houses the primary piston defining the primary pressure chamber connected to the primary spigot 120, and the auxiliary part 150 houses the secondary piston defining the secondary chamber supplying the secondary pressure to the secondary spigot 121.

Figure 3:
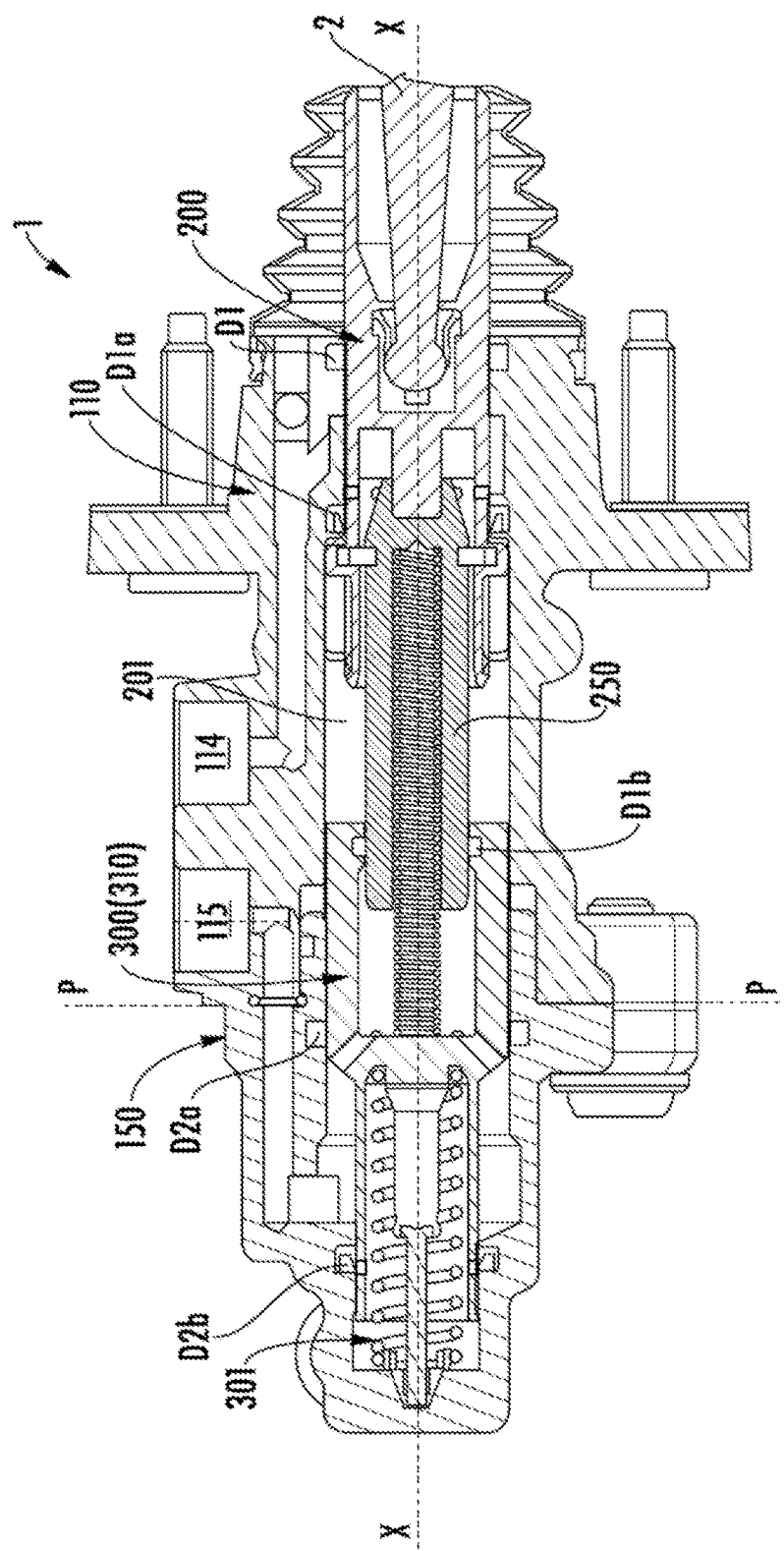
FIG. 3 is an axial cross section of the brake control unit in FIG. 2.
Figure 4A:
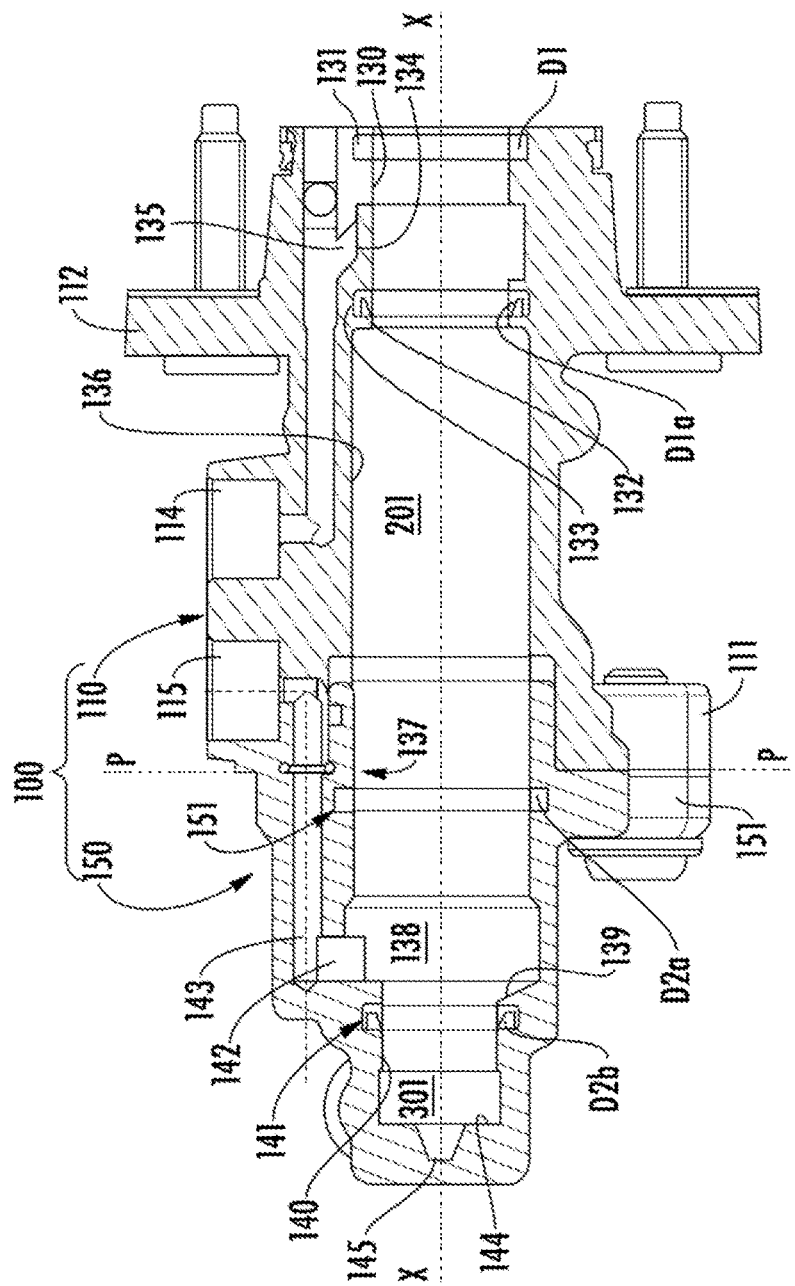
FIG. 4A is a view in axial cross section of the body of the control unit.
Figure 4B:
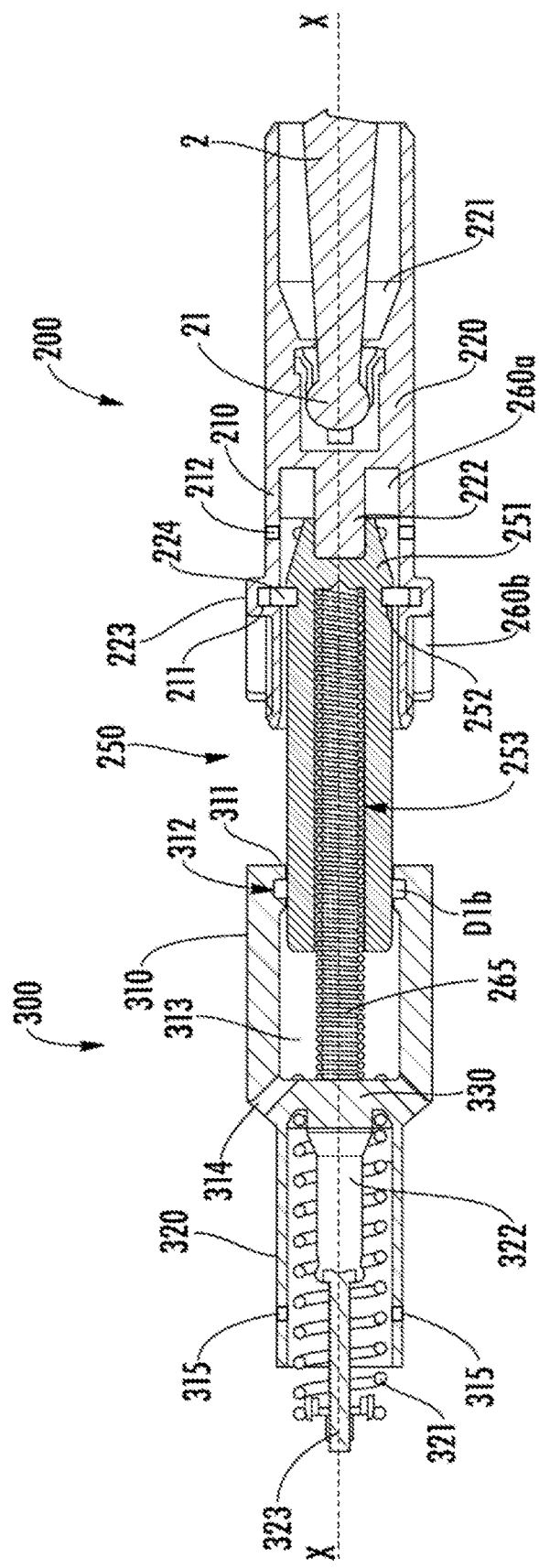
FIG. 4B is an axial cross section of the pistons in the control unit.

FIG. 3 shows in cross section the details of the structure of the brake control unit 1 depicted in FIG. 2, and of which the details are more readily evident in the separate cross sectional views in FIGS. 4A, 4B.

The body 100 receives the primary piston 200 in its principal part 110 and the secondary piston 300 in its auxiliary part 150. The primary piston 200 carries at the front a plunger piston 250 sliding in the rear of the secondary piston 300.

The bore which accommodates the primary piston 200 is equipped with a rear seal D1 and with a primary pressure seal D1a.

The secondary piston 300 cooperates with a secondary insulating seal D2a and a secondary pressure seal D2b.

Finally, the plunger piston 250 cooperates with a primary insulating seal D1b carried by the rear of the secondary piston 300.

The primary chamber 201 is defined inside the bore by the primary piston 200, by the plunger piston 250 and the secondary piston 300 as well as by the seals D1a, D2a, D1b between the fixed and mobile parts. The supply to the primary chamber 201 takes place via supply orifices 212 in the primary piston 200 and a distribution throat bounded by the seals D1, D1a.

The secondary chamber 301 is defined by the front interior of the secondary piston 300, the bore housing the piston 300 and the seal D2b. The supply to the secondary chamber 301 takes place via supply orifices 315 in the secondary piston 300 and a distribution throat bounded by the seals D2a, D2b.

FIG. 4A shows the cross section of the body 100 of the brake control unit with the principal part 110 and the auxiliary part 150, assembled in the junction plane PP. In the axis xx of the body, which is also the axis of the control unit, the principal part 110 includes, from right to left, an inlet bore forming a first bearing 130 having a throat 131 accommodating a rear seal D1 intended to provide the inlet sealing of the primary piston and a bore 132 having a throat 133 for the primary pressure seal D1a: the bore 132 is not a bearing in the sense of a guide bearing. The front guiding of the primary piston takes place through its collar 223 in FIG. 4B on the bore 136 of the principal body in FIG. 3A. The rear guiding of the primary piston 200 takes place on the bearing 130. The bearing 130 and the bore 132 with the seals D1, D1a define a peripheral distribution throat 134, into which the pipe 135 originating from the inlet 114 of the brake fluid reservoir discharges. Beyond this peripheral throat 134 and the primary pressure seal D1a, the cross section increases as an enlarged bore 136 continuing in the auxiliary part 150 through the same bore 137 including a peripheral throat 151 for accommodating the secondary insulating seal D2a in order to cooperate with the secondary piston 300. The primary chamber 201 is situated at the level of the enlarged bore 136 upstream of the junction between the principal part 110 and the auxiliary part 150.

The bore 137 includes a secondary distribution throat 138 bounded, on the front side, by a shoulder 139 having a reduction in diameter in order to form the bore 140 of the secondary chamber 301. The bore 140 includes a peripheral throat 141 accommodating the secondary pressure seal D2b.

The supply to the secondary chamber 301 takes place via a passage 142 communicating with the channel 143 connected to the secondary inlet 115 of the brake fluid reservoir.

The cross section of the secondary chamber 301 increases beyond the bore 140. In this part, the secondary chamber 201 is connected to the spigot 121 of the secondary circuit. In the axis xx, the base 144 of the cavity has a centering recess 145.

The primary pressure seal D1a and the secondary pressure seal D2b as well as the secondary insulating seal D2a are customarily referred to as "cups". They possess an annular form of recumbent U-shaped cross section, of which the opening is turned towards the side that is subjected to the greater of the two pressures to either side of the seal, in such a way that the seal opens under the effect of the pressure and is applied against the base of the throat by one of the branches of the U-shaped form, and against the surface of the primary or secondary piston by the other branch of said U-shaped cross section. This continuous form does not require a more detailed description.

FIG. 4B shows, with the same orientation as the preceding figures, the structure of the combination formed by the primary piston 200 and the secondary piston 300 that are connected by the plunger piston 250. This assembly is aligned in the axis xx of the control unit 1.

The primary piston 200 has a cylindrical skirt 210 carried by a body 220 forming a partition substantially at its center. The rear opening 221 of the piston 200 receives the spherical head 21 of the push-rod 2 engaged in the cavity of the body 220. At the front, the primary piston 200 receives the plunger piston 250 integrally in translation. For mechanical reasons, the plunger piston 250 is not made integral with the primary piston 200 by a rigid connection in the transverse direction, but only in the direction of the axis xx. The connection between the two pistons by means of the locking ring effectively ensures their integration in translation, in other words the transmission of axial forces between them, although it also includes clearances permitting a necessary degree of radial freedom in order to avoid any mechanical jamming which may result, inter alia, in misalignments between the guiding plane of the primary piston in the body 110 and that of the secondary piston in the body 150, which slides in the secondary piston 300. The plunger piston 250 is engaged on a pin 222 projecting from the body of the primary piston 200 in the axis xx. The rear extremity 251 of the plunger piston 250 is attached to the primary piston 200 by means of a locking device 224 of the split ring type housed, on the one hand, in a peripheral interior throat 211 of the skirt 210 and, on the other hand, in a corresponding throat 252 close to the rear extremity 251 of the plunger piston 250. The throat 211 is formed inside a collar 223 constituting a support surface, which, with the piston 200 in its rest position, comes up against the shoulder formed between the enlarged bore 136 of the body 100 and the bore of the bearing 130 receiving and guiding the skirt 210 of the primary piston 200. The bore 132 is not a guide bearing. Between the rear extremity 252 of the plunger piston 250 and the base of the front cavity of the primary piston, the pin 222 carries an annular magnet 260a intended to cooperate with the position sensor that is integrated in the principal part 110 of the housing. Said sensor 170 is represented in FIG. 2 by its electrical connector.

Figure 1:
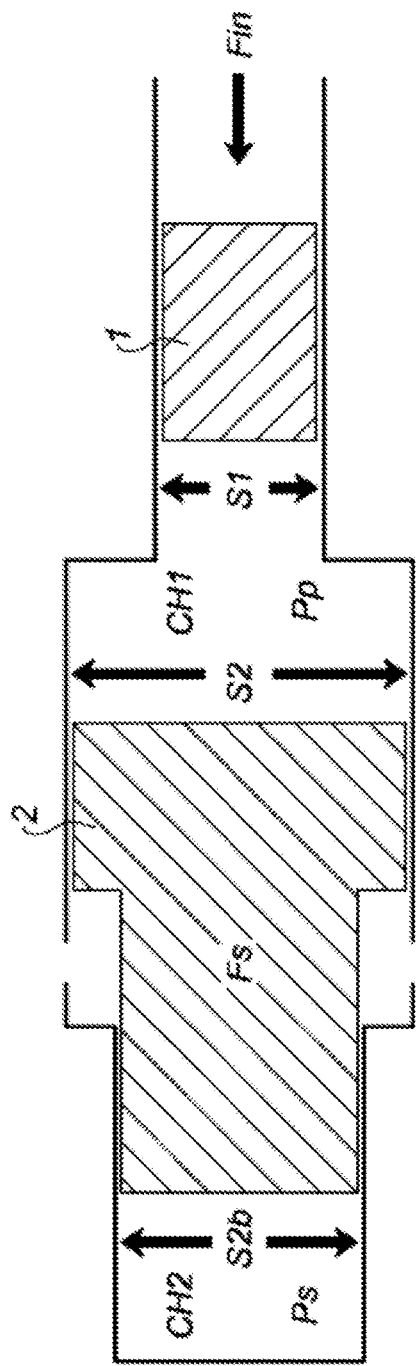
FIG. 1 is a simplified diagram of a known tandem master cylinder.

The front of the skirt 210, beyond the annular collar 223 housing the split ring 224, is occupied by an annular magnet 260b that is likewise intended to cooperate with the position sensor 170 represented in FIG. 1. Said position sensor supplies signals that are transmitted to the brake control and management circuit by means of an integrated connector.

The plunger piston 250 has an axial housing 253 accommodating a compression spring 265, via which the primary piston 200 comes up against the secondary piston 300 in order to be forced back together into a rest position.

The secondary piston 300 is a cylindrical component with two cross sections. At the rear, the piston 300 has a skirt 310 of large diameter, and at the front a skirt 320 of reduced diameter. These two skirts 310, 320 are connected by the body 330 in the form of a partition. The inlet of the skirt 310 of large diameter forms a bearing 311 serving for the guidance of the plunger piston 250. Said bearing 311 is provided with a peripheral throat 312 for accommodating the primary insulating seal D1b. The cavity 313 defined in the skirt of large diameter 310 and the plunger piston 250 communicates with the throat 138 via drillings 314, through which the brake fluid passes as it arrives from the reservoir or is pumped back in such a way as not to block the movement of the plunger piston 250 in relation to the secondary piston 300.

At the front, the skirt 320 of the secondary piston houses a compression spring 321 that is fitted over and is guided on a tubular body 322, which continues in the form of a pin 323. The tubular component 322 and the pin 323 are free to slide one in relation to the other. The compression spring 321 comes up against the base 144 of the secondary chamber 301 of reduced diameter of the auxiliary part 150 and pushes the secondary piston 300 back towards the right.

According to FIG. 3, the primary chamber 201 is defined inside the enlarged bore 136 between the front of the primary piston 200, the plunger piston 250 and the rear of the secondary piston 300. The secondary chamber 301 is defined by the bore of reduced cross section 138 of the auxiliary part 150 and the skirt of small diameter 320 at the front of the secondary piston 300.

In the rest position, the primary chamber 201 communicates via the space between the front of the skirt 210 and the plunger piston 250 through the supply drillings 212 of the skirt 210 with the distribution throat 134 connected to the pipe 135 for the supply of brake fluid from the reservoir. The same applies for the secondary chamber 301 that is supplied in the rest position through the supply orifices 315 which at that time are present beyond the secondary pressure seal D2b in the distribution throat 138 communicating with the reservoir via the passage 142 and the channel 143 as far as the inlet 115. When the primary piston 200 is displaced towards the left, the communication made via the drillings 212 in the skirt 210 of the primary piston 200 is interrupted, said drillings passing beyond the primary pressure seal D1a and, by so doing, interrupting the communication with the arrival of liquid from the reservoir.

The same applies for the secondary piston 300, which, as it is pushed towards the left, causes the supply drillings 315 produced in the front skirt 320 of the secondary piston 300 to pass beyond the secondary pressure seal D2b in such a way that the secondary chamber is disconnected from the arrival of brake fluid. In this active position of the primary chamber 201 and of the secondary chamber 301, each of the chambers is disconnected from the reservoir and then communicates only with the primary circuit and the secondary circuit of the braking system by compressing the brake fluid therein.

In the control unit according to the disclosure, of which the structure has already been described above in association with FIGS. 2, 3, 4A, 4B, the primary and secondary pressure seals D1a, D2b as well as the rear seal Dr and the secondary insulating seal D2a are cups, that is to say annular seals having a recumbent U-shaped cross section with two branches, one of which is applied against the base of the throat, and the other against the skirt 210, 320 of the primary piston 200 or the secondary piston 300, and having an orientation such that the pressure to which they are subjected applies their sealing lips firmly against the external surface of the primary piston or the secondary piston. In other words, the cavity of the recumbent U-shape of each of the cups is turned towards the pressure side of the primary chamber or of the secondary chamber.

Figure 5:
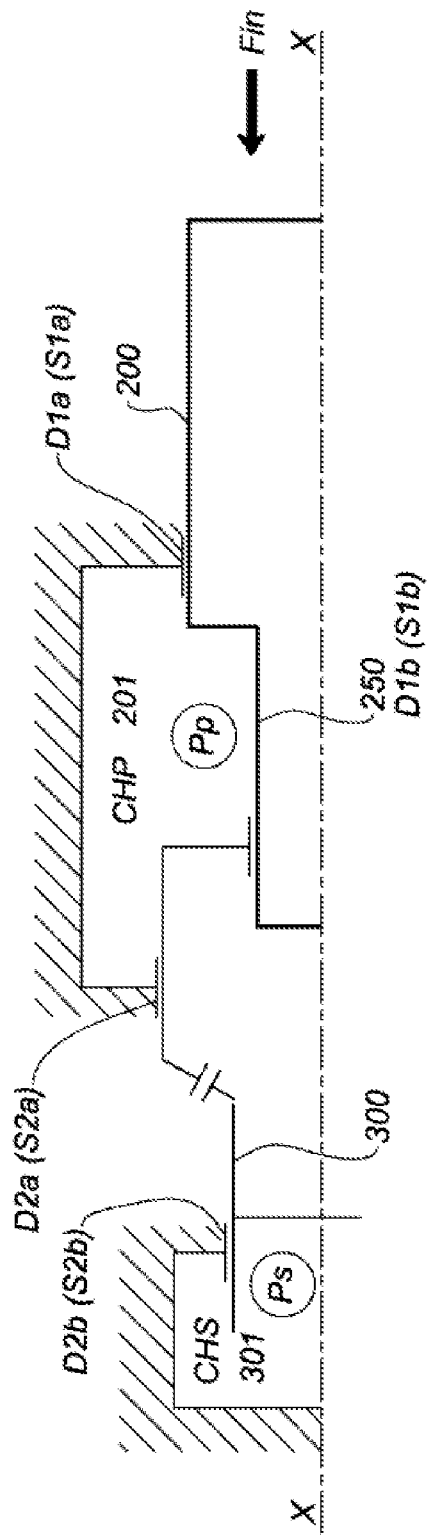
FIG. 5 is a simplified diagram of the tandem master cylinder according to the disclosure in order to explain the characterizing features of the pistons of the master cylinder.

In FIG. 5, the simplified diagram of the tandem master cylinder 100 according to the disclosure, represented in half cross section in relation to its axis xx, makes it possible to express the characterizing feature connecting the inlet force $F_{IN}$ to the secondary pressure Ps inside the secondary chamber CH2 (301):

The primary piston 200 cooperates with the primary pressure seal D1a of cross section S1a.

The plunger piston 250 cooperates with the secondary piston 300 via the primary insulating seal S1b of cross section D1b.

The secondary piston 300 cooperates with a secondary pressure seal D2b of cross section S2b, and with a secondary insulating seal D2a of cross section S2a.

Under these conditions:

The front hydraulic cross section S1 of the primary piston 200 is the difference between its primary pressure cross section S1a and its primary insulating cross section S1b, where:

$$S1 = S1a - S1b$$

The rear hydraulic cross section S2 of the secondary piston 300 is the difference between its secondary insulating cross section S2a and its primary insulating cross section S1b, where:

$$S2 = S2a - S1b$$

The front cross section of the secondary piston 300 is the secondary pressure cross section S2b.

Since a plunger piston 250 is provided between the primary piston and the secondary piston, the equivalent cross section Se (formula (5)) is expressed as follows:

$$Se = \frac{S_1}{S_2} \cdot S_{2b} = \frac{S1a - S1b}{S2a - S2b} \cdot S2b \qquad (7)$$

This formula may express S1b by a simple transformation:

$$S1b = S2a \frac{\frac{Se}{S2b} - \frac{S1a}{S2a}}{\frac{Se}{S2b} - 1}$$

Or in the following form:

$$S1b = A \frac{Se - B}{Se - C} \qquad (8)$$

In this formula, A, B, C are predefined constants that are obtained by expressing formula (8) in the following form:

$$\left( S1b = S2a \cdot \frac{Se - \frac{S1a \cdot S2b}{S2a}}{Se - S2b} \right) \qquad (8\text{bis})$$

Thus:

$$A = S2a \quad B = \frac{S1a \cdot S2b}{S2a} \quad C = S2b$$

The cross sections S1$a$, S2$a$, S2$b$ are imposed by the characterizing features that the tandem master cylinder must possess and by the lower limits that are imposed on the diameters of the cups.

Se is a fixed value at the start, since it is the characterizing feature defining the relationship between the force applied at the inlet $F_{IN}$ and the secondary pressure Ps inside the secondary chamber.

The cross section of the primary insulating seal D1$b$ and accordingly its diameter and that of the piston plunger 250 are thus clearly established, since the cross section S1$b$ gives the diameter [D1$b$] of the seal D1$b$:

$$[D1b] = 2\sqrt{\frac{S1b}{\pi}}$$

LIST OF REFERENCE DESIGNATIONS 1 brake control unit/brake master cylinder
2 push-rod
21 spherical head
100 body
110 principal part
111 assembly lug
112 flange
113 screw
114,115 inlets to the brake fluid reservoir
120 primary spigot
121 secondary spigot
130 inlet bore/first bearing
131 throat
132 bore
133 throat
134 primary distribution throat
135 pipe connected to the reservoir
136 enlarged bore
137 enlarged bore of the auxiliary part
138 secondary distribution throat
139 shoulder
140 bore of the secondary chamber
141 peripheral throat
142 passage
143 channel
144 base of the cavity
145 recess
150 auxiliary part
151 assembly lug/peripheral throat
160 gaiter
170 position sensor
200 primary piston
201 primary chamber
210 cylindrical skirt of primary piston
211 interior peripheral throat
212 supply orifice
220 body forming a partition
221 rear opening
222 pin
223 collar
224 split ring
250 plunger piston
251 rear extremity of the plunger piston
252 throat
253 axial housing
260$a,b$ magnets
265 compression spring
300 secondary piston
301 throat
310 skirt
311 bearing
312 throat
313 cavity
314 drilling
315 supply drilling
320 skirt of reduced diameter
321 compression spring
322 tubular body
323 pin
330 body in the form of a partition connecting the two skirts 310, 320
CHP primary chamber
CHS secondary chamber
De equivalent diameter
Dr rear seal
D1$a$ primary pressure seal
D2$a$ secondary insulating seal
D1$b$ primary insulating seal
D2$b$ secondary pressure seal
$F_{IN}$ inlet force
$F_S$ force exerted on the secondary piston
$P_P$ primary pressure
Ps secondary pressure
Se equivalent cross section
S2 rear cross section of the secondary piston
S2$d$ front cross section of the secondary piston
S1 front cross section of the primary piston
S1$a$ cross section of the primary pressure seal
S1$b$ cross section of the primary insulating seal
S2$a$ cross section of the secondary insulating seal
S2$b$ cross section of the secondary pressure seal

The invention claimed is:

1. A brake control unit, comprising:
a body that includes a bore;
a primary piston positioned in the bore, and defining a primary chamber connected to a primary circuit;
a secondary piston positioned in the bore, and defining a secondary chamber connected to a secondary circuit, the primary piston configured to push against the secondary piston so as to generate a pressure inside the primary chamber which then exerts a hydraulic thrust on a rear hydraulic cross section (S2) of the secondary piston;
a braking demand signal supplied via a push-rod actuated by a driver, the brake control unit configured to receive the braking demand signal;
a displacement sensor configured to detect the braking demand signal for the movement of the push-rod in order to control the primary piston; and
a plunger piston carried by the primary piston, the plunger piston being integral in translation with the primary piston and penetrating freely into the secondary piston such that the primary chamber is defined between the primary piston, the secondary piston in the bore and the plunger piston;

wherein the primary piston has a primary pressure seal, the secondary piston has a secondary pressure seal, and the plunger piston has a primary insulating seal for its engagement in the secondary piston, such that the primary piston has a front hydraulic cross section (S1) equal to the difference in a primary pressure cross section (S1$a$) of the primary piston and in a primary insulating cross section (S1$b$) of the plunger piston, the rear hydraulic cross section (S2) is equal to the difference between a secondary insulating cross section (S2$a$) of the secondary piston and the primary insulating cross section (S1$b$) of the plunger piston, an equivalent cross section (Se) for the brake unit is defined by a relationship between an inlet force ($F_{IN}$) acting on the primary pressure cross section (S1$a$) and a secondary pressure ($P_S$) in the secondary chamber by the equation $$P_S = \frac{F_{IN}}{Se};$$

and a front cross section (S2$b$) of the secondary piston is related to the equivalent cross section (Se) by the equation $$S1b = A\frac{Se - B}{Se - C};$$

wherein (A), (B), and (C) are defined by the equations $$A = S2a \quad B = \frac{S1a \cdot S2b}{S2a} \quad C = S2b;$$

wherein the relationship between the front cross section (S2$b$) of the secondary piston and the equivalent cross section (Se) defines the primary insulating cross section (S1$b$) and a diameter of the primary insulating seal as a function of the equivalent cross section (Se);

wherein the primary piston includes a skirt with a body forming a partition that closes the primary piston and that includes:
  a first side that receives the head of the push-rod originating from the brake pedal; and
  a second side that receives the plunger piston;
the bore includes:
  a first portion that is configured to guide the primary piston, and that defines a shoulder; and
  a second portion that is configured to guide the second piston, and that has a diameter that is larger than a diameter of the first portion; and
wherein the skirt includes an external collar configured to serve as a stop abutting against the shoulder of the first portion of the bore.

2. The brake control unit as claimed in claim 1, wherein the primary pressure seal and the secondary pressure seal are cups.

3. The brake control unit as claimed in claim 1, wherein the primary pressure seal and the secondary pressure seal are annular seals having a recumbent U-shaped cross section with two lips, and wherein the primary insulating seal is a toric seal.

4. A brake control unit, comprising:
a body that includes a bore;
a primary piston positioned in the bore, and defining a primary chamber connected to a primary circuit;
a secondary piston positioned in the bore, and defining a secondary chamber connected to a secondary circuit, the primary piston configured to push against the secondary piston so as to generate a pressure inside the primary chamber which then exerts a hydraulic thrust on a rear hydraulic cross section (S2) of the secondary piston;
a braking demand signal supplied via a push-rod actuated by a driver, the brake control unit configured to receive the braking demand signal;
a displacement sensor configured to detect the braking demand signal for the movement of the push-rod in order to control the primary piston; and
a plunger piston carried by the primary piston, the plunger piston being integral in translation with the primary piston and penetrating freely into the secondary piston such that the primary chamber is defined between the primary piston, the secondary piston in the bore and the plunger piston;
wherein the primary piston has a primary pressure seal, the secondary piston has a secondary pressure seal, and the plunger piston has a primary insulating seal for its engagement in the secondary piston, such that the primary piston has a front hydraulic cross section (S1) equal to the difference in a primary pressure cross section (S1$a$) of the primary piston and in a primary insulating cross section (S1$b$) of the plunger piston, the rear hydraulic cross section (S2) is equal to the difference between a secondary insulating cross section (S2$a$) of the secondary piston and the primary insulating cross section (S1$b$) of the plunger piston, an equivalent cross section (Se) for the brake unit is defined by a relationship between an inlet force ($F_{IN}$) acting on the primary pressure cross section (S1$a$) and a secondary pressure ($P_S$) in the secondary chamber by the equation $$P_S = \frac{F_{IN}}{Se};$$

and a front cross section (S2$b$) of the secondary piston is related to the equivalent cross section (Se) by the equation $$S1b = A\frac{Se - B}{Se - C};$$

wherein (A), (B), and (C) are defined by the equations $$A = S2a \quad B = \frac{S1a \cdot S2b}{S2a} \quad C = S2b;$$

wherein the relationship between the front cross section (S2$b$) of the secondary piston and the equivalent cross section (Se) defines the primary insulating cross section (S1$b$) and a diameter of the primary insulating seal as a function of the equivalent cross section (Se);

wherein the primary pressure seal and the secondary pressure seal are cups;
wherein the primary piston includes a magnet positioned externally on a side of the primary piston proximate to the primary insulating cross section (S1*b*) of the primary piston, and configured to detect movement;
wherein an extremity of the plunger piston is housed in an interior of the primary piston; and
wherein the primary piston further includes a pin projecting from a body of the primary piston, and engaged with the extremity of the plunger piston.

5. A brake control unit, comprising:
a body that includes a bore;
a primary piston positioned in the bore, and defining a primary chamber connected to a primary circuit;
a secondary piston positioned in the bore, and defining a secondary chamber connected to a secondary circuit, the primary piston configured to push against the secondary piston so as to generate a pressure inside the primary chamber which then exerts a hydraulic thrust on a rear hydraulic cross section (S2) of the secondary piston;
a braking demand signal supplied via a push-rod actuated by a driver, the brake control unit configured to receive the braking demand signal;
a displacement sensor configured to detect the braking demand signal for the movement of the push-rod in order to control the primary piston; and
a plunger piston carried by the primary piston, the plunger piston being integral in translation with the primary piston and penetrating freely into the secondary piston such that the primary chamber is defined between the primary piston, the secondary piston in the bore and the plunger piston;
wherein the primary piston has a primary pressure seal, the secondary piston has a secondary pressure seal, and the plunger piston has a primary insulating seal for its engagement in the secondary piston, such that
the primary piston has a front hydraulic cross section (S1) equal to the difference in a primary pressure cross section (S1*a*) of the primary piston and in a primary insulating cross section (S1*b*) of the plunger piston,
the rear hydraulic cross section (S2) is equal to the difference between a secondary insulating cross section (S2*a*) of the secondary piston and the primary insulating cross section (S1*b*) of the plunger piston,
an equivalent cross section (Se) for the brake unit is defined by a relationship between an inlet force ($F_{IN}$) acting on the primary pressure cross section (S1*a*) and a secondary pressure ($P_S$) in the secondary chamber by the equation $$P_S = \frac{F_{IN}}{Se};$$

and
a front cross section (S2*b*) of the secondary piston is related to the equivalent cross section (Se) by the equation $$S1b = A\frac{Se - B}{Se - C};$$

wherein (A), (B), and (C) are defined by the equations $$A = S2a \quad B = \frac{S1a \cdot S2b}{S2a} \quad C = S2b;$$

wherein the relationship between the front cross section (S2*b*) of the secondary piston and the equivalent cross section (Se) defines the primary insulating cross section (S1*b*) and a diameter of the primary insulating seal as a function of the equivalent cross section (Se);
wherein the plunger piston includes:
an axial housing with an opening facing toward the secondary piston; and
a compression spring positioned in the axial housing and configured to press against a base of the plunger piston facing towards the secondary piston, and against a base of the secondary piston facing towards the plunger piston.

6. A brake control unit, comprising:
a body that includes a bore;
a primary piston positioned in the bore, and defining a primary chamber connected to a primary circuit;
a secondary piston positioned in the bore, and defining a secondary chamber connected to a secondary circuit, the primary piston configured to push against the secondary piston so as to generate a pressure inside the primary chamber which then exerts a hydraulic thrust on a rear hydraulic cross section (S2) of the secondary piston;
a braking demand signal supplied via a push-rod actuated by a driver, the brake control unit configured to receive the braking demand signal;
a displacement sensor configured to detect the braking demand signal for the movement of the push-rod in order to control the primary piston; and
a plunger piston carried by the primary piston, the plunger piston being integral in translation with the primary piston and penetrating freely into the secondary piston such that the primary chamber is defined between the primary piston, the secondary piston in the bore and the plunger piston;
wherein the primary piston has a primary pressure seal, the secondary piston has a secondary pressure seal, and the plunger piston has a primary insulating seal for its engagement in the secondary piston, such that
the primary piston has a front hydraulic cross section (S1) equal to the difference in a primary pressure cross section (S1*a*) of the primary piston and in a primary insulating cross section (S1*b*) of the plunger piston,
the rear hydraulic cross section (S2) is equal to the difference between a secondary insulating cross section (S2*a*) of the secondary piston and the primary insulating cross section (S1*b*) of the plunger piston,
an equivalent cross section (Se) for the brake unit is defined by a relationship between an inlet force ($F_{IN}$) acting on the primary pressure cross section (S1*a*) and a secondary pressure ($P_S$) in the secondary chamber by the equation $$P_S = \frac{F_{IN}}{Se};$$

and
a front cross section (S2b) of the secondary piston is related to the equivalent cross section (Se) by the equation $$S1b = A\frac{Se - B}{Se - C};$$

wherein (A), (B), and (C) are defined by the equations $$A = S2a \quad B = \frac{S1a \cdot S2b}{S2a} \quad C = S2b;$$

wherein the relationship between the front cross section (S2b) of the secondary piston and the equivalent cross section (Se) defines the primary insulating cross section (S1b) and a diameter of the primary insulating seal as a function of the equivalent cross section (Se);
wherein the secondary piston is formed by a rear part of large diameter and by a front part of small diameter;
wherein the rear part is positioned in a first portion of the bore having a large diameter;
wherein the brake unit further comprises a secondary insulating seal positioned in the first portion of the bore;
wherein the front part is positioned in a second portion of the bore having a smaller diameter;
wherein the secondary pressure seal is positioned in the second portion of the bore; and
wherein an internal surface of the rear part has a bearing equipped with the primary insulating seal of the plunger piston.

7. A tandem master cylinder for a brake system, comprising:
a body that includes a bore having a middle bore portion and an end bore portion with a diameter that is smaller than a diameter of the middle bore portion;
a primary piston that includes:
  a first end portion received in the middle bore portion; and
  a second end portion extending out from an end of the bore opposite the end bore portion, and configured to receive a braking demand signal via a push-rod;
a secondary piston that includes:
  a third end portion received in the middle bore portion and facing toward the first end portion of the primary piston, an inner surface of the third end having a bearing; and
  a fourth end portion at least partially received in the end bore portion, and having a diameter that is less than a diameter of the third end portion, the fourth end portion and the end bore portion defining a secondary pressure chamber configured to connect to a secondary brake circuit;
a plunger piston that includes:
  a first plunger end axially fixed to the first end portion of the primary piston; and
  a second plunger end received in and operatively engaged with the bearing of the third end portion of the secondary piston, such that the middle bore portion, the primary piston, the plunger piston, and the secondary piston together define a primary pressure chamber configured to connect to a primary brake circuit;
a first pressure seal positioned between the primary piston and the bore so as to seal off the second end portion of the primary piston from the primary pressure chamber;
a first insulating seal positioned between the plunging piston and the bearing, and equipped on the bearing so as to seal off the primary pressure chamber from an interior of the third end portion of the secondary piston;
a second pressure seal positioned between the secondary piston and the bore so as to seal off the fourth end portion of the secondary piston and the secondary pressure chamber from a remainder of the secondary piston; and
a secondary insulating seal positioned between the secondary piston and the bore so as to seal off the primary pressure chamber from the interior of the third end portion of the secondary piston
wherein a primary pressure in the primary pressure chamber is related to an extent to which the primary piston is inserted into the bore;
wherein an extent to which the secondary piston is inserted into the end bore portion is related to the primary pressure in the primary pressure chamber; and
wherein a secondary pressure in the secondary pressure chamber is related to the extent to which the secondary piston is inserted into the end bore portion.

8. The tandem master cylinder of claim 7, wherein the body includes:
a first body portion that includes the end bore portion; and
a second body portion that includes at least a part of the middle bore portion.

9. The tandem master cylinder of claim 8, wherein:
the second body portion defines a shoulder at an end of the middle bore portion facing away from the end bore portion, and having a diameter smaller than a diameter of the middle bore portion; and
the primary piston further includes a collar positioned in the middle bore portion, and having a diameter that is larger than the second end portion of the primary piston, such that the collar acts as a stop configured to engage the shoulder so as to delimit motion of the primary piston out from the bore.

10. The tandem master cylinder of claim 7, wherein the primary piston further includes:
an axial pin projecting from the first end portion of the primary piston and engaged with the first plunger end of the plunger piston; and
a locking ring that axially fixes the plunger piston to the primary piston, and that enables radial freedom between the plunger piston and the primary piston.

11. The tandem master cylinder of claim 7, wherein:
the second plunger end of the plunger piston includes a hollow axial housing with an opening facing toward the third end portion of the secondary piston; and
the plunger piston further includes a compression spring positioned in the axial housing so that a first end of the compression spring bears against a base of the axial housing facing toward the secondary piston, and so that a second end of the compression spring bears against an inner surface of the third end portion of the secondary piston facing toward the primary piston.

12. The tandem master cylinder of claim 11, wherein the bearing of the secondary piston is engaged with the second plunger end of the plunger piston so as to seal off the inner surface of the third end portion of the secondary piston and the hollow axial housing from the primary pressure chamber.

13. The tandem master cylinder of claim 7, wherein:
the body further includes:
- a first input configured to connect the primary pressure chamber to a pressure medium reservoir; and
- a second input configured to connect the secondary pressure chamber to the pressure medium reservoir;

the primary piston is configured such that axial motion of the primary piston into the middle bore portion closes the first input and seals off the primary pressure chamber from the pressure medium reservoir; and the secondary piston is configured such that axial motion of the secondary piston into the end bore portion closes the second input and seals off the secondary pressure chamber from the pressure medium reservoir.

14. The tandem master cylinder of claim 7, further comprising:
- a magnet that is positioned on an outside surface of the second end portion of the primary piston; and
- a position sensor configured to cooperate with the magnet to determine a position of the primary piston in the bore.

15. The tandem master cylinder of claim 14, further comprising:
an annular magnet, wherein:
- the primary piston further includes an axial pin projecting from the first end portion of the primary piston and engaged with the first plunger end of the plunger piston; and
- the annular magnet is positioned around the axial pin, and is configured to cooperate with the position sensor to determine the position of the primary piston in the bore.

* * * * *